April 6, 1943.   R. J. BEITEL, JR   2,316,042
ADJUSTABLE PERIMETER TARGET
Filed May 19, 1941
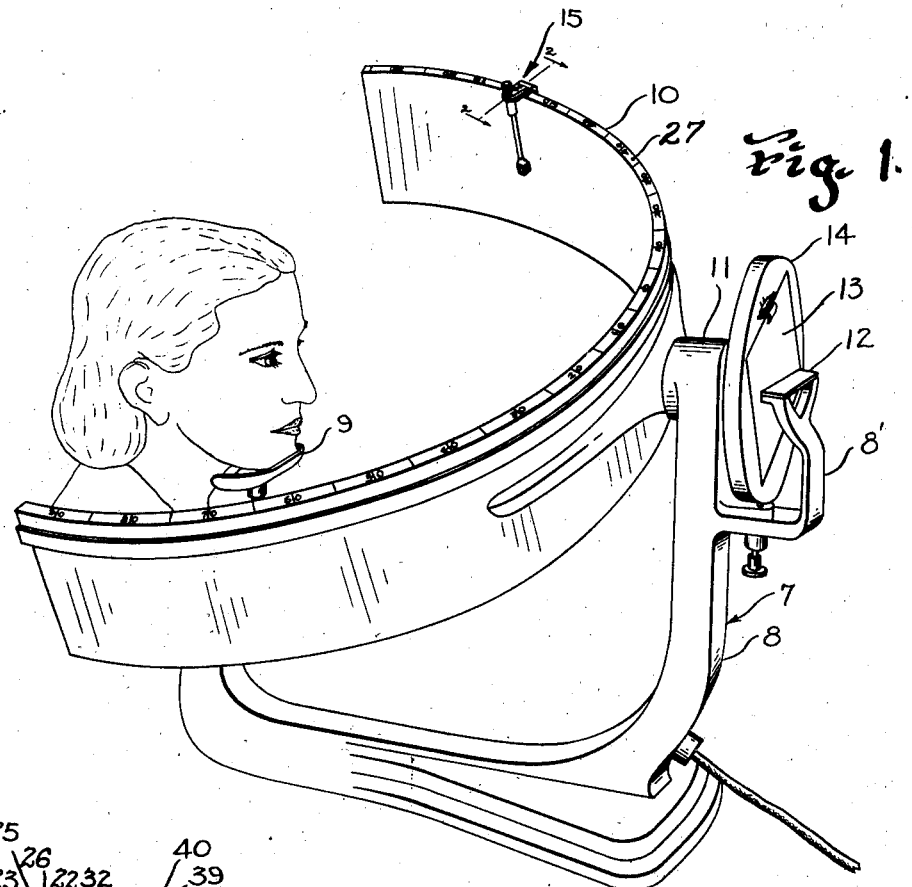
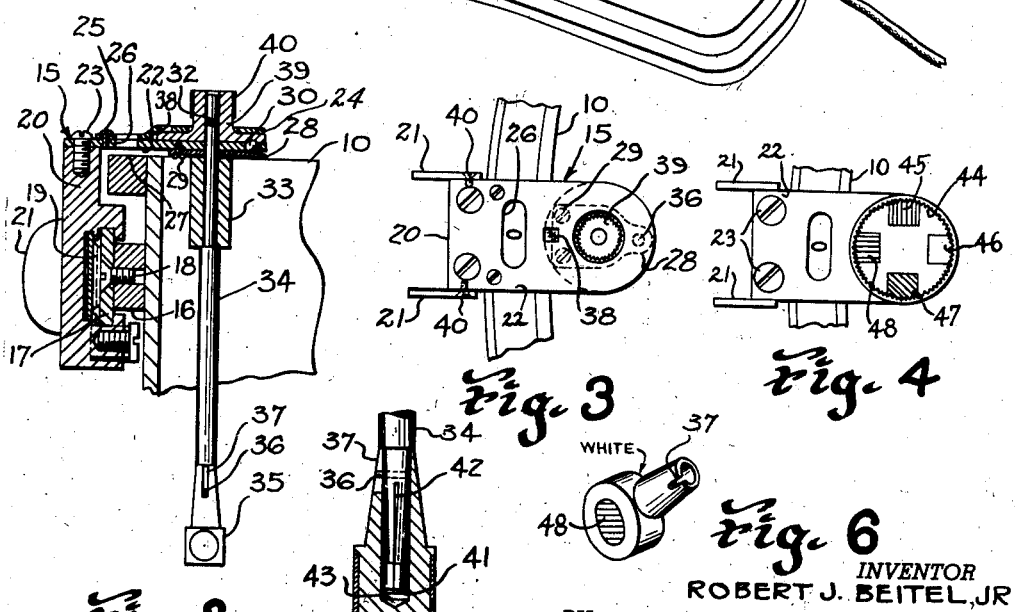
INVENTOR
ROBERT J. BEITEL, JR
BY
Louis L. Gagnon
ATTORNEY Patented Apr. 6, 1943

2,316,042

UNITED STATES PATENT OFFICE 2,316,042

ADJUSTABLE PERIMETER TARGET

Robert J. Beitel, Jr., Southbridge, Mass., assignor to American Optical Company, Southbridge, Mass., a voluntary association of Massachusetts Application May 19, 1941, Serial No. 394,056

8 Claims. (Cl. 88—20)

This invention pertains to an eye testing device used for the purpose of determining the character and extent of the indirect field of vision. More specifically, the invention pertains to a means for varying the color of the test object and observing the results of the variation from a point other than in line of sight of the test object.

This invention refers to an eye testing device which is in the same general category as an eye testing device commonly referred to as a "perimeter." The perimeter consists essentially of a semi-circular arc pivoted so as to revolve about a horizontal axis and thus permit testing in all meridians. The radius of the arc determines the patient's distance of fixation.

The method of testing consists in bringing the test object into the patient's field of vision from the extreme periphery of the arc. The patient fixates a central fixation target in the center of the arc and reports the appearance of the test object as soon as it becomes visible in his indirect field of vision. The same method applies for white and for colored test objects. The principle in determining the extent of the color fields involves the determination of the points in the peripheral field where the true color of the test object is recognized. Test objects are graded in size in order that the sensitivity of the different regions of the field may be measured. The extent of the field of vision, other things being equal, varies according to the size of the test object used. In general, the larger the test object the larger the field of vision, that is the farther out in the periphery of the field will the test object be seen. The size of the test object is usually calibrated in terms of the degrees of visual angle which the test object subtends at the nodal point of the patient's eye. The test object and the central fixation object are frequently referred to in the art as the movable target and the fixed or central target respectively.

The remote viewing of the test object color, as presented in this application is advantageous since formerly it was necessary for the eye examiner to bend over the inside of the arc and observe the same test object that is presented to the patient in order for the eye examiner to determine what specific color was presented to the patient. With the present invention, the eye examiner may remain behind the arc of the device and know positively what indication is presented to the patient.

An object of the invention is the provision of a remote test object color indicator to indicate the test object color presented to the view of a patient under examination.

A further object is to provide a more efficient apparatus used in conjunction with a device of the class described for giving positive indications to the eye examiner of the exact indication presented to the patient.

A further object is to provide a remote test object color indicator employing interchangeable targets or test objects with means thereon for causing the true colors of the test object to register with a corresponding color of the remote color indicator.

A further object is to provide a remote test object color indicator with means for presenting a single color which is the true color of the test object placed in line of sight of the patient under examination.

A further object is to provide a test object having a given character or intelligence thereon with remote means for indicating the positional disposition of the test object character or intelligence.

A still further object is to provide a test object color varying means with means for revolving same and simultaneously therewith indicating at a remote point the color of the test object presented in line of sight of the patient.

A still further object is to provide a test object having more than one color thereon with a remote means for indicating the location of the various colors of the test object.

Other and further objects may be or may become apparent from the following description taken in connection with the accompanying drawing, and it will be apparent that many changes may be made in the details of construction and arrangement of parts, without departing from the spirit of the invention as expressed in the accompanying claims. The exact details shown and described are preferred forms only shown by way of illustration and are not to be considered as limitations.

In the drawing:

Fig. 1 shows a perspective view of the eye testing device with the test object mounted on the arc thereof.

Fig. 2 is a partial sectional view taken substantially along lines 2—2 of Fig. 1 of the test object and carriage mounted on the arc.

Fig. 3 is a top view of the carriage and test object on a section of the arc.

Fig. 4 is a modification of Fig. 3 having all colors exposed to view.

Fig. 5 is an enlarged view partially in section showing a test object in operative position on the carrier spindle.

Fig. 6 shows a two color test object with the target slot laterally displaced for color coordination with the remote color indicator.

Referring to the drawing and more particularly to Fig. 1 the eye testing device 7 has a master support 8 with a chin rest 9 disposed substantially at the radius of the arc 10, which arc is pivotally mounted in a journal 11. A scale 12 is supported on the scale support 8' which is attached to the master support 8, with the scale 12 located adjacent the chart 13, which chart is carried by a chart support 14 secured to the master support. The purpose of the chart 13 is for recording the test observations. The carriage 15 is adapted to be slidably moved about the arc so that the test object may be moved about said arc so that the angular position of the test object may be noted when the patient observes the presence or non-presence of certain test indicia.

The test arc 10 shown partially broken away in Fig. 2 has a carriage 15 mounted on a T-shaped member 16, which T-shaped member is connected to the arc by any suitable means, said T-shaped member comprises in part a cap plate 17 held in position by a screw 18. A spring 19 is loosely connected to the vertical portion 20 of the carriage so that the spring 19 will slidably and frictionally impinge the cap plate 17 when the finger grip 21 is manipulated to move the carriage about the arc.

A horizontal plate 22 is fixedly connected to the upper end of the vertical portion 20 by means of a screw 23. A cover plate 24 is fixedly connected to the horizontal plate 22 by means of a screw 25 and apertures 26 exist in the cover plate 24 and the horizontal plate 22 so that the apertures are in alignment with one another to provide a viewing area through to the graduated scale which exists on the upper surface of the scale bar 27. A spring 28 is fixedly connected to the underneath side of the horizontal plate by means of a screw 29, which spring urges a ball 30 located in a ball retainer in the plate 22 upwardly to frictionally impinge the underneath surface of the knob plate 39, which knob plate is held in place by a pin or screw such as 32. A hub 33 is connected to the upper portion of the spindle 34 which assembly is held in position by the pin 32. A four way test object 35 is located on the free end of the spindle 34 and is positionally aligned thereon by means of a pin 36 fitting in a slot 37. The pin and slot arrangement is utilized for the purpose of preventing error in coordinating a given color test object with the color corresponding thereto as observed through the aperture 38 of the cover plate 24. The underneath surface of the knob plate 39 has suitably aligned indentures therein for receiving the ball 30 so that under the action of the spring 28 a snap action will cause the various colors to be temporarily locked in position when any of the colors of the knob plate 39 are properly in registery with the aperture 38. From the foregoing it will be seen that under action of movement of the finger grip of the carriage, said carriage may be moved about the arc 10. It will also be seen that rotation of the knob plate by the gripping means 40 will cause the various colors to appear in the aperture 38 which corresponds to the color of a test object 35 which faces the patient.

A top view of the carriage 15 located on a portion of the arc 10 shows the finger grips 21 secured to the vertical portion 20 of the carriage by means of screws 40. The apertures 26 show a zero reading therethrough, which reading is on the graduated scale member 27 and is located directly above the central fixation object or target in the center of the arc. The knob proper 40 of the knob plate 39 is shown in relation to the ball on the spring 30 and 28 respectively. The aperture 38 is horizontally centrally aligned with the cover plate 24.

A modification of the showing in Figs. 2 and 3 is presented in Fig. 4. In this instance the colors red 45, white 46, green 47, and blue 48 appear in that specific order around the knob 44, which order and position is consistent with the order and position of the colors appearing on the test object. In this present showing the colors appearing on the knob 44 per se, is somewhat similar to the arrangement shown in Fig. 2, except that in Fig. 2 the colors appear on the knob plate and are all obscured from sight with the exception of one color showing through the aperture 38. It is to be understood that since the color noticeable through the aperture on the cover plate in Fig. 2 will be observed by the person who stands in back of the arc, making the test, it must correspond with the color presented to the patient being examined. While the disclosure in Fig. 4 has the test object color and the knob color on the same side, this is in contradistinction to the disclosure in Fig. 2 where the test object color is on the opposite side of the device from the color presented through the aperture of the color plate. However, the knob 44 may be revolved 180° so that the color nearest the eye examiner will indicate the color of the test object with other compensations for color coordination if necessary. The device shown in Fig. 4 is more simple in construction than that shown in Fig. 2. When the device as shown in Fig. 4 is utilized, the eye examiner sees all of the four colors and must remember that if he is standing behind the arc, the color presented to the patient under examination is the color on the far side of the knob. With the device shown in Fig. 2 the eye examiner knows that the color he sees is the color that is presented to the patient and consequently there can be no mistake in observation by the eye examiner.

The test objects vary in color, and also in size. Consequently, it may be desirable to use a test object having only two colors thereon as shown in Figs. 5 and 6. When the two colors such as the blue 48 and white colors are desired on opposing sides of the test object, the positioning slot 37 of the test object must be so located that when it is in position on the spindle 34 the color on the test object presented to the patient will correspond to the color on the knob plate 39 presented through the aperture 38 to the eye examiner.

When the two-sides test object is used with the remaining two colors such as red and green, the target slot 37 must be at right angles to the target slot in the test object using the blue and white colors.

Concerning the two-way target or test object, a concrete example of the location of the keyway or target slot 37 may be as shown in Fig. 6 wherein blue 48 and white surfaces are presented. When a similar two-sided test object is used having the red and green colors the slot 37 would be disposed at a 90° angle from that shown in Fig. 6. The red and green colors would accordingly be affixed on the test object so that a given color presented to the patient would correspond to a similar color presented to the eye examiner.

The enlarged view in Fig. 5 shows the free end of the carrier spindle 34 having an enlarged head 41 with a slot 42 extending through the head and a portion of the spindle 34, so that the head may be urged into the opening 43 in the test object. The spring action of parts in the split portion of the spindle grips the inner surfaces of the sidewalls of the hole 43 and retains the test object on the spindle.

While the member 10 has been referred to as an arc, it is to be understood that it may also be referred to as a test object track since in some cases of testing the eyes, the test object track may be fixed in a plane at a right angle to the visual axis of the eye. In general, the application refers to various colors which may be of different sizes, which various sizes of color are the test objects per se. However, certain tests may require that characters be used such as a letter, a geometrical figure, a series of dots or dashes, or other intelligence. Since colors, characters, and other visible intelligence may be used interchangeably, depending on the particular results desired, it is to be understood that the general expression "intelligence" may be employed in the application, and also presented in the claims, to be inclusive of color, character, or other suitable visible indication.

The means employed in the present invention may involve changes from the specific disclosure set forth herein and minor changes may readily suggest themselves. The right to make certain minor departures from the specifications and drawing is retained and equivalent parts may be used within the spirit of the invention as defined by the subjoined claims.

Having described my invention, I claim:

1. An eye testing device of the class described comprising a test object track, a central fixation point disposed adjacent said track, a carriage movably mounted on said track, said carriage having a spindle rotatably mounted thereon, a test object having a plurality of different indicia thereon connected to one end of said spindle, test object indicating means having indicia thereon corresponding to the indicia on the test object mounted adjacent the opposing end of said spindle, and means adjacent said test object indicating means permitting only one of said indicia of the test object indicating means to be visible, said visible indicia on the test object indicating means corresponding to a test object indicia disposed in a given position.

2. An eye testing device of the class described comprising a curved track for moving a test object thereon, a central fixation point disposed adjacent said track, a carriage movably mounted on said track, said carriage having a spindle rotatably mounted thereon, means for rotating said spindle, a test object having various color indicia thereon connected to one end of said spindle, and indicating means mounted adjacent the opposing end of said spindle to indicate the particular color indicia which is exposed forwardly within the curved track.

3. An eye testing device of the class described comprising a curved track for moving a test object thereon, a central fixation object disposed substantially centrally of the ends of said curved track, a carrier movably mounted on said track, said carrier having a spindle rotatably mounted thereon and disposed within the curve of said track, a test object having a plurality of colored indicia connected to the lower end of said spindle, color indicating means connected to the opposing end of said spindle, means to rotate said spindle, and means adjacent said color indicating means to indicate the particular test object color indicia which is disposed in a given position within the curved track.

4. An eye testing device of the class described comprising a curved track for moving a test object thereon, a central fixation object disposed substantially centrally of the ends of said curved track, a carrier movably mounted on said track, said carrier having a spindle rotatably mounted thereon and disposed within the curve of said track, a test object having a plurality of colored indicia connected to the lower end of said spindle, color indicating means connected to the opposing end of said spindle, means to rotate said spindle, means adjacent said color indicating means to indicate the particular test object color indicia which is disposed in a given position within the curved track, and scale indicia to indicate the position of the carriage on the curved track.

5. An eye testing device of the class described comprising a curved track for moving a test object thereon, a central fixation point disposed substantially centrally of the ends of said curved track, a carrier movably mounted on said track, said carrier having a spindle rotatably mounted thereon and disposed within the curve of said track, a test object having a plurality of colored indicia connected to the lower end of said spindle, color indicating means connected to the opposing end of said spindle, means to rotate said spindle, and cover means having an aperture therein connected to said carriage and disposed to cover all but one of said color indicating means, to the end that the color appearing through the aperture in said cover will indicate the particular test object color indicia which is disposed in a given position in front of the curved track.

6. An eye testing device of the class described comprising a curved track for moving a test object thereon, a central fixation point disposed substantially centrally of the ends of said curved track, a carrier movably mounted on said track, said carrier having a spindle rotatably mounted thereon and disposed within the curve of said track, a test object having a plurality of colored indicia connected to the lower end of said spindle, color indicating means connected to the opposing end of said spindle, means to rotate said spindle, cover means having an aperture therein connected to said carriage and disposed to cover all but one of said color indicating means, to the end that the color appearing through the aperture in said cover will indicate the particular test object color indicia which is disposed in a given position in front of the curved track, and detent means operatively connected with the spindle for locating the center of the test object color indicia with its corresponding color indicating means.

7. An eye testing device of the class described comprising a curved track for moving a test object thereon, a central fixation point disposed substantially centrally of the ends of said curved track, a carrier movably mounted on said track, said carrier having a spindle rotatably mounted thereon and disposed within the curve of said track, a test object having a plurality of colored indicia connected to the lower end of said spindle, color indicating means connected to the opposing end of said spindle, complemental aligning means on the test object and the spindle to properly align a particular color of the test object with a corresponding color of the color indicating means, and means to rotate said spindle.

8. An eye testing device of the class described comprising a curved track for moving a test object thereon, a central fixation point disposed substantially centrally of the ends of said curved track, a carrier movably mounted on said track, said carrier having a spindle rotatably mounted thereon and disposed within the curve of said track, a test object having a plurality of colored indicia connected to the lower end of said spindle, color indicating means connected to the opposing end of said spindle, complemental aligning means on the test object and the spindle to properly align a particular color of the test object with a corresponding color of the color indicating means, means to rotate said spindle, and means adjacent said color indicating means to indicate the particular test object color indicia which is disposed in a given position within the curved track.

ROBERT J. BEITEL, Jr.